Dec. 4, 1928.
1,694,335
G. MURRAY ET AL
MEANS FOR AUTOMATICALLY DISCHARGING LIQUIDS FROM CHAMBERS,
AUTOMATIC FOUNTAINS, AND THE LIKE DEVICES
Filed Dec. 20, 1927  3 Sheets-Sheet 3
*Fig.4.*
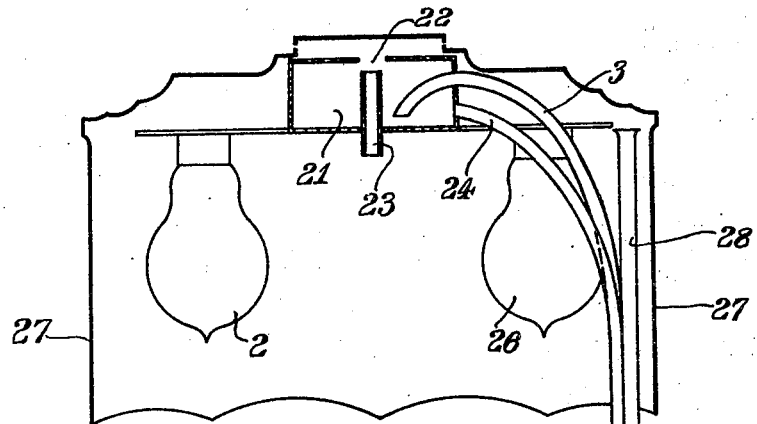
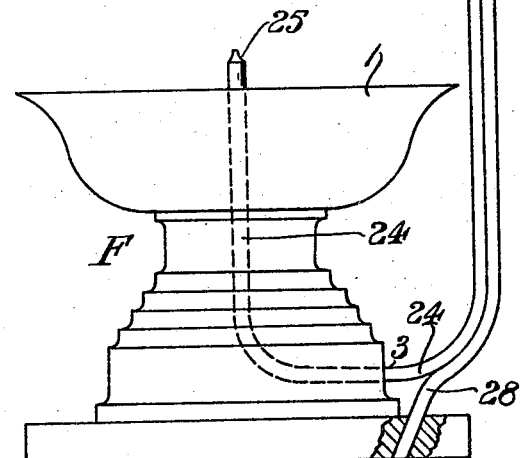
INVENTORS:
GEORGE MURRAY
VICTOR O. SIMPKINS,
By their Attorneys, Patented Dec. 4, 1928.

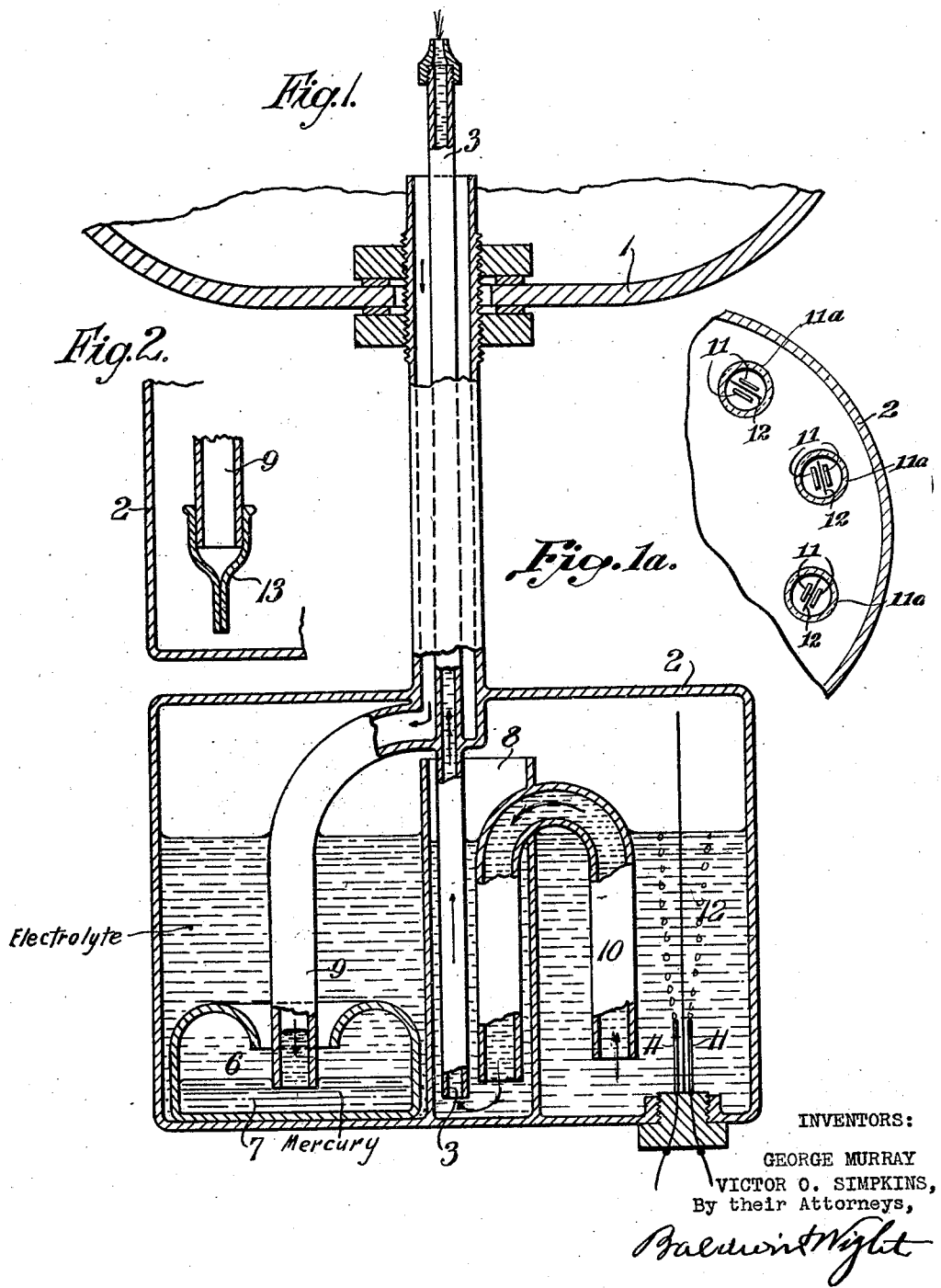

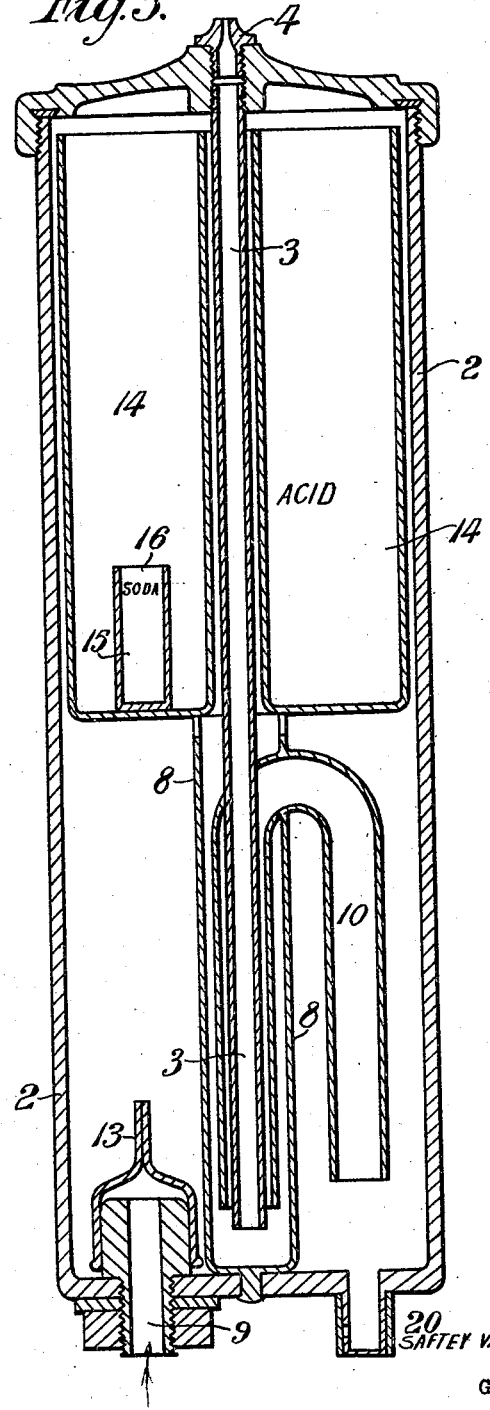

1,694,335

UNITED STATES PATENT OFFICE.

GEORGE MURRAY AND VICTOR OWEN SIMPKINS, OF LONDON, ENGLAND.

MEANS FOR AUTOMATICALLY DISCHARGING LIQUIDS FROM CHAMBERS, AUTOMATIC FOUNTAINS, AND THE LIKE DEVICES.

Application filed December 20, 1927, Serial No. 241,335, and in Great Britain December 18, 1926.

This invention relates to means for automatically discharging liquids from chambers, automatic fountains and the like devices, and has for one of its principal objects to provide an apparatus in which the necessity for mechanically moving parts is obviated.

The invention, while not limited in its application thereto, is particularly suitable for automatic fountains, humidifying devices, air purifying devices and the like apparatus, in which a chamber containing liquid is required to be discharged.

The invention envisages the provision of means for automatically charging and discharging a chamber, substantially without the use of mechanically moving parts and to this end the said means comprise in combination a chamber adapted to contain liquid, means for applying gas pressure to said liquid, means for permitting egress of said liquid under the application of said gas pressure, liquid inlet means, and means, which may be intermittent in action, for preventing the application of said gas pressure to said inlet means, so that the said chamber may receive liquid through said liquid inlet means.

The means for preventing the application of said gas pressure to said liquid inlet means may comprise means for releasing said gas pressure when the chamber has been discharged to a predetermined extent.

The means for applying gas pressure to the liquid within the chamber may comprise an electrolyte, and electrodes immersed therein, whereby said electrolyte may be electrolytically dissociated to generate gas; the said means may comprise a cylinder of gas under pressure, a cylinder of chemicals adapted to dissociate to form gas under pressure or a means may be used to apply pressure alone to the liquid and for instance by heating the chamber containing the liquid.

The liquid within the chamber may itself constitute the electrolyte and the said chamber be adapted to accumulate or maintain gas pressure from said electrolyte.

Means, in accordance with this invention, for automatically charging and discharging a chamber, may comprise in combination a chamber adapted to contain liquid, means for applying gas pressure to said liquid, means for permitting egress of said liquid under the application of said gas pressure and adapted to release said gas pressure when the chamber has been discharged to a predetermined extent, and liquid inlet means to said chamber, the said last mentioned means incoporating means for retaining a hydraulic head balancing the resistance of the liquid egress means, whereby the chamber is prevented from recharging until the gas pressure is released.

In one form of construction an automatic fountain suitable for decorative and/or air humidifying or purifying purposes, comprises a vertical cylindrical container adapted to be partly filled with an electrolyte, such as impure water (ordinary tap water) and provided at or near its base with two flat platinum or like electrodes. Attached to the top of the container and concentric therewith, is a flat circular basin which communicates with the said container through a valve or valves adapted automatically to be opened, when the level of the electrolyte falls below a predetermined amount, and to be closed when the container has been refilld to a predetermined extent. Located within the container is a tube open at its lower end and passing through the dividing wall between the said container and the basin, the upper end of the said tube being provided with a nozzle or other suitable spraying device.

The operation of the fountain is as follows:—

When a current is passed through the electrolyte between the electrodes, the said electrolyte is electrolytically dissociated into gases which accumulate in the upper end of the container, giving rise to gas pressure which forces the electrolyte up the tube and through the nozzle or spraying device, when it is caught by the basin. After a period of time, the level of the electrolyte in the container falls a predetermined amount, a vent is opened, the gases of dissociation are released, the container is refilled to a predetermined level from the basin, the vent closes and the cycle of operations recommences.

It will be appreciated that when water is employed as the electrolyte, the products of electrolysis will contain oxygen, a gas which possesses valuable air purification properties. If desired, any known means (such as brush discharge) may be provided to generate ozone in the gases of dissociation.

In a further modification, the gas pressure generated by dissociation of the electrolyte is employed to expel a liquid other than the electrolyte, such, for example, as a scent or disinfectant. For this purpose the second fluid may be separated from the electrolyte by means of a wall or partition, the arrangement being such that the gas pressure operates upon the surface of the second fluid, into which the output tube dips. In such an arrangement the valves employed for the return of fluid from the basin (where such return is desired) lead into that part of the container wherein is the second fluid.

If desired, when the invention is applied to fountains for decorative purposes, an electric lamp may be provided in or upon the said fountain, and in some cases may conveniently be connected in series with the electrodes.

Again, if desired, a scent or a disinfectant or colouring matter, such as fluorescein or a colloid, may be mixed with the electrolyte.

The invention is illustrated in the accompanying drawings, in which are shown examples of constructions of automatic fountains in accordance with the said invention.

In said drawings:

Figure 1 is a vertical sectional view through one form of the invention;

Figure 1a is a detail horizontal sectional view of a modification applicable to said form;

Figure 2 is a detail vertical section of a non-return valve which may be substituted for the mercury trap or valve of Figure 1;

Figure 3 is a vertical sectional view taken through a form of the invention in which a chemical is used to generate gas;

Figure 4 is a view partly in elevation and partly in vertical section showing the invention built into an ornamental fountain and table lamp.

Referring first to Figure 1, 1 is an ornamental basin beneath which is situated a chamber 2. A pipe 3, terminating at its upper end in a jet 4, projects downwards into the chamber almost to the bottom thereof. This pipe forms the liquid egress means, the jet rendering it resistant to liquid flow. The liquid inlet means comprise a second pipe 5, concentric with and surrounding the pipe 3, leading from the basin 1 to the chamber 2 and terminating in a pipe 9 which dips into a mercury trap 6, the mercury of which is indicated at 7 thus forming a valve at the inlet of said pipe 9. Surrounding the pipe 3 is a vertical tube 8, open at the top, extending from the bottom of the chamber almost to the top, the inlet pipe communicating with the chamber on the outside of the vertical tube. A siphon tube 10 communicates between the exterior of the vertical tube 8 and the interior. Situated within the chamber is a plurality of pairs of electrodes 11, only one pair of which is shown. The electrodes of each pair may be insulated from one another by a vertical member 12.

The operation of the device is as follows:—

Assuming the chamber 2 to be free from gas under pressure, water flows from the basin 1 through the tube 5 through the mercury trap to that part of the chamber around the vertical tube 8, filling the said part to a level about the top of the siphon tube, then filling the vertical tube to a like level. If the current be on, the water is dissociated by the electrodes, and a gas pressure is thereby generated which forces the water up the outlet pipe through the jet at the top thereof, whence it falls into the basin. At the same time the gas pressure "closes" the mercury trap by creating a hydraulic head of mercury in the pipe 9. As water is discharged through the outlet pipe it is replaced by fresh water through the siphon tube 10, and the action proceeds until the level of liquid falls to such an extent that the gas is released from the chamber through the pipe 3. This removes the pressure maintaining the hydraulic head in the pipe 9, and the chamber therefor refills from the basin, the gas displaced by the incoming liquid escaping through the pipe 3.

In a modification as shown fragmentarily in plan in Figure 1a, each pair of electrodes is situated in a vertical tubular container 11a of glass or other insulating material, open at the top, said containers being arranged around and within the chamber. In this way effective insulation is obtained between the pairs of electrodes.

In a further modification the mercury trap is replaced by a rubber nonreturn valve 13 (Figure 2), fitted over the end of the pipe 9.

In a further modification the electrodes are replaced by a cylinder 14 of chemicals, adapted to generate gas. In such an arrangement the cylinder may be centrally situated and the inlet and outlet pipes, siphon, etc., arranged in an annulus about the said cylinder, which may thus be made readily removable through the base, top or side of the chamber.

One convenient form of chemically operated automatic fountain is illustrated in Figure 3. This arrangement, which is intended to be immersed in a container or bath of water (not shown), comprises an annular case 14 situated in the upper part of a casing 2 and containing any convenient known chemicals, adapted to generate gas which is free to exert pressure upon a liquid in the lower part of the casing 2. (The gas paths are not shown in the figure.) 20 is a safety pressure valve similar to the well known bicycle tire valve and comprising a rubber sleeve embracing and normally sealing a pierced tube. The chemicals may include dilute tartaric acid and a tablet 15 of fused anhydrous carbonate of soda, adapted to be dissociated thereby, the said tablet being cylindrical in form and waxed all over, except upon one flat face 16, so that chemical action will proceed at a substantially constant rate. As will be seen, the liquid inlet means comprise a pipe 9 and nonreturn valve 13, situated at the bottom of the casing; for the rest, the device is deemed self-explanatory from the figure.

In the modification illustrated in Figure 4, which shows an ornamental automatic fountain made in the form of a table lamp, intermittent action of the fountain is avoided and a continuous jet of water obtained. In this figure the apparatus, designated generally by the letter F, is a chamber charging and discharging device, according to any of the hereinbefore described constructions. The outlet pipe 3, however, of the device is extended upwards and terminates in a circular header tank 21, open to atmosphere at 22 and provided with an overflow pipe 23. A return pipe 24 leads back from the header tank and terminates in a jet 25 located centrally in a basin 1. 26 are electrical lamps which, together with an ornamental shade 27, are carried by the tank. The lamps are energized from wires led up a tube 28, which, together with the pipes 3, 24, serve to carry the header tank. The pipes 3, 24 and 28 are of hexagonal section and are nested together. It will be seen that the action of the tank 21 is to retain a hydraulic head, thus keeping the fountain in continuous operation.

We claim:—

1. In combination, a chamber adapted to contain a liquid, means for substantially continuously creating gas pressure in the chamber, a pipe leading from the chamber through which the liquid is discharged by said gas pressure, inlet means having a valve means normally held closed by said gas pressure, said pipe serving to vent said gas pressure when the liquid level falls below a predetermined point in said chamber to allow opening of said valve means and inflow of liquid, and means for maintaining said pipe open for venting said gas pressure until the liquid level rises to a predetermined point in said chamber.

2. In combination, a chamber adapted to contain a liquid, means for substantially continuously creating gas pressure in the chamber, a pipe leading from the chamber through which the liquid is discharged by said gas pressure, inlet means having a valve means normally held closed by said gas pressure, said pipe serving to vent said gas pressure when the liquid level falls below a predetermined point in said chamber to allow opening of said valve means and inflow of liquid, and means for isolating the inflowing liquid from the discharge pipe, and siphon means for conveying the liquid to said discharge pipe to seal the same and be discharged therethrough on the liquid reaching a predetermined level.

3. In combination, a chamber adapted to contain a liquid, means for substantially continuously creating gas pressure in the chamber, a pipe leading from the chamber through which the liquid is discharged by said gas pressure, inlet means having a valve means normally held closed by said gas pressure, said pipe serving to vent said gas pressure when the liquid level falls below a predetermined point in said chamber to allow opening of said valve means and inflow of liquid, a tube for isolating the inflowing liquid from said discharge pipe, and means for rendering the tube inoperative as an isolating means when the liquid reaches a predetermined level.

4. In combination, an electrolyte chamber, means in said chamber for continuously dissociating said electrolyte to create gas pressure, a pipe leading from said chamber through which said electrolyte is discharged by said gas pressure, electrolyte inlet means having a check valve means held closed by said gas pressure, means for venting said gas pressure when the electrolyte level falls below a predetermined point in said chamber to allow opening of said check valve means and inflow of electrolyte, and means for maintaining said venting means open until the electrolyte level rises to a predetermined point in said chamber.

5. In combination, a chamber adapted to contain a liquid, means for substantially continuously creating pressure in the chamber, a pipe communicating with the chamber adjacent the lower part thereof and extending upwardly from the chamber through which the pressure discharges the liquid, means to receive the liquid from said pipe, means for conducting the liquid from the receiving means to said chamber, check means acted on by said pressure to prevent flow through said conducting means, said pipe means serving to vent said pressure after the liquid level has fallen to a predetermined point to allow said check means to open for inflow of liquid, and means for maintaining said pipe open for venting said pressure until the liquid level rises to a predetermined point in said chamber.

6. In combination, a chamber to contain a liquid, means for substantially continuously creating pressure in the chamber, means forming a passage for the discharge of the liquid from the chamber under said pressure and means for the return of the liquid to said chamber, said last named means including a device functioning as a valve normally held against opening by said pressure, and means serving to vent said pressure when the liquid level falls to a predetermined extent and until the liquid level rises to a predetermined point.

7. In combination, a chamber to contain a liquid, means for substantially continuously creating pressure in the chamber, a tube rising from the base of the chamber and open above said base, a pipe disposed with its lower end in the tube and open adjacent the base of the latter for discharge of liquid upwardly therethrough by said pressure, an inlet pipe arranged to receive discharged fluid, the discharge pipe extending for a portion of its length through the inlet pipe, said inlet pipe having an offset portion disposed adjacent the base of and within said chamber, check means for the lower end of said inlet pipe normally held closed by said pressure, said discharge pipe serving to vent pressure when the liquid level falls below a predetermined point in said chamber to allow opening of said check means and inflow of liquid, and siphon means for conveying the liquid to said discharge pipe to seal the same and be discharged therethrough on the liquid reaching a predetermined level.

In testimony that we claim the foregoing as our invention, we have signed our names this 8th day of December, 1927.

GEORGE MURRAY.
VICTOR OWEN SIMPKINS.